(12) United States Patent
Cepulis

(10) Patent No.: US 8,464,086 B2
(45) Date of Patent: Jun. 11, 2013

(54) SOFTWARE-BASED POWER CAPPING

(75) Inventor: Darren J. Cepulis, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 12/920,575

(22) PCT Filed: Mar. 3, 2008

(86) PCT No.: PCT/US2008/055664
§ 371 (c)(1),
(2), (4) Date: Sep. 1, 2010

(87) PCT Pub. No.: WO2009/110884
PCT Pub. Date: Sep. 11, 2009

(65) Prior Publication Data
US 2011/0016337 A1 Jan. 20, 2011

(51) Int. Cl.
G06F 1/32 (2006.01)
(52) U.S. Cl.
USPC ............................ 713/323; 713/330; 713/340
(58) Field of Classification Search
USPC .................................. 713/300, 323, 330, 340
See application file for complete search history.

(56) References Cited

U.S. PATENT DOCUMENTS

| 5,996,084 | A * | 11/1999 | Watts | 713/323 |
|---|---|---|---|---|
| 6,535,798 | B1 * | 3/2003 | Bhatia et al. | 700/293 |
| 6,848,054 | B1 * | 1/2005 | Watts, Jr. | 713/300 |
| 7,051,221 | B2 * | 5/2006 | Clabes et al. | 713/320 |
| 7,194,641 | B2 * | 3/2007 | Hack | 713/300 |
| 7,318,164 | B2 * | 1/2008 | Rawson, III | 713/320 |
| 7,330,988 | B2 * | 2/2008 | Golla et al. | 713/322 |
| 7,334,142 | B2 * | 2/2008 | Hack | 713/320 |
| 7,451,332 | B2 * | 11/2008 | Culbert et al. | 713/320 |
| 7,788,670 | B2 * | 8/2010 | Bodas et al. | 718/105 |
| 7,822,996 | B2 * | 10/2010 | Watts, Jr. | 713/300 |
| 7,949,888 | B2 * | 5/2011 | Cox et al. | 713/323 |
| 7,975,156 | B2 * | 7/2011 | Artman et al. | 713/323 |
| 2002/0188877 | A1 * | 12/2002 | Buch | 713/320 |
| 2003/0115495 | A1 * | 6/2003 | Rawson, III | 713/324 |
| 2004/0148528 | A1 * | 7/2004 | Silvester | 713/300 |
| 2005/0049729 | A1 * | 3/2005 | Culbert et al. | 700/50 |
| 2006/0020831 | A1 * | 1/2006 | Golla et al. | 713/300 |
| 2006/0236135 | A1 * | 10/2006 | Jones | 713/300 |

(Continued)

FOREIGN PATENT DOCUMENTS

| CN | 1608240 A | 4/2005 |
|---|---|---|
| CN | 101040241 | 9/2007 |
| JP | 10-091298 | 4/1998 |
| JP | 2005/209198 | 8/2005 |

OTHER PUBLICATIONS

Tanenbaum, Andrew S.; "Structured Computer Organization"; Prentice-Hall, Inc.; 1990; Third Edition; pp. 11-13.*

(Continued)

Primary Examiner — Ryan Stiglic

(57) ABSTRACT

The present invention relates to power consumption, and specifically an apparatus, method, and computer readable medium to manage and control power consumption in computer systems. Specifically, the present invention manages power consumption by controlling the types of threads that are executed by the processor. The present invention monitors the resources of the system to determine the power consumption of the system. If the power consumption is too high, the present invention issues more low power threads to be executed by the processor.

17 Claims, 5 Drawing Sheets

U.S. PATENT DOCUMENTS

2009/0106571 A1* 4/2009 Low et al. .................. 713/310
2009/0177422 A1* 7/2009 Cox et al. ..................... 702/64
2009/0177907 A1* 7/2009 Sotomayor et al. .......... 713/340
2009/0271046 A1* 10/2009 Lewis et al. ................ 700/291
2010/0191993 A1* 7/2010 Chaudhry et al. ........... 713/322
2011/0239025 A1* 9/2011 Artman et al. .............. 713/323

OTHER PUBLICATIONS

International Searching Authority, The International Search Report and the Written Opinion, Oct. 31, 2008, 13 Pages.

* cited by examiner

SOFTWARE-BASED POWER CAPPING

FIELD OF THE INVENTION

The present invention relates to power consumption, and specifically an apparatus, method, and computer readable medium to manage and control power consumption in computer systems.

BACKGROUND OF THE INVENTION

Effectively managing power consumption and heat generation in computer systems and data centers is desired.

SUMMARY OF THE INVENTION

A first embodiment of the invention relates to an apparatus for controlling power usage, comprising one or more computers comprising the following components therein or among them if more than one, a software monitor component operable to monitor one or more variables related to power usage in the apparatus, and a launching component to launch at least one low power thread based upon an instruction issued from the software monitor component if the value of one or more variables related to power usage exceeds a threshold for that variable.

A second embodiment of the invention relates to a method for controlling power usage in a computer system, comprising the steps of monitoring electronically one or more variables related to power usage in the system, and launching electronically at least one low power thread based upon an instruction issued from software on the computer system, if the value of one or more variables related to power usage exceeds a threshold for that variable.

A third embodiment of the invention relates to a computer readable medium, having installed thereon computer readable code which when executed, performs a method for controlling power usage in a computer system, comprising the steps of monitoring one or more variables related to power usage in the system, and launching at least one low power thread based upon an instruction issued from software on the system, if the value of one or more variables related to power usage exceeds a threshold for that variable.

A fourth embodiment of the invention relates to an apparatus for controlling power usage, comprising means for monitoring one or more variables related to power usage in the system and means for launching at least one low power thread based upon an instruction issued from software on the system, if the value of one or more variables related to power usage exceeds a threshold for that variable.

A fifth embodiment of the invention relates to an apparatus for controlling power usage, comprising a software monitor component operable to dynamically determine a power utilization threshold based upon a criterion, and a launching component to launch at least one low power thread based upon an instruction issued from the software monitor component, if the power utilization threshold is exceeded A sixth embodiment of the invention relates to an apparatus for controlling power usage, comprising a user input component, wherein a user issues at least one instruction to launch at least one low power thread and a launching component to launch at least one low power thread based upon an instruction issued from the user input component.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

DETAILED DESCRIPTION OF THE PREFERRED EMBODIMENTS

Figure 1:
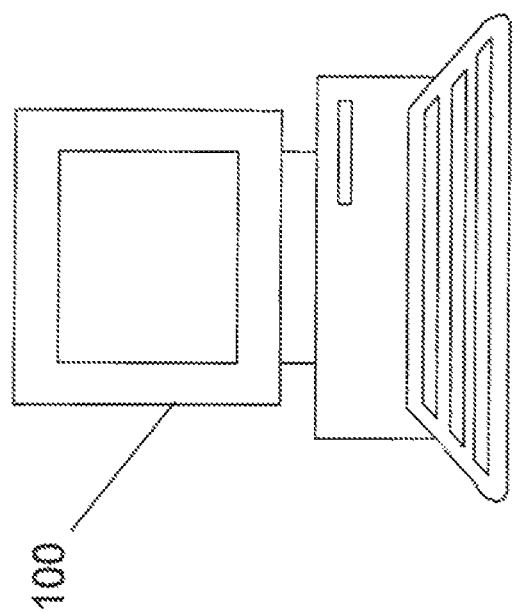
FIG. 1 is a schematic diagram of a computer system.

FIG. 1 depicts a computer system. The system controls its processing and execution of programs by a central processing unit (CPU). The CPU is limited by its clock speed, which determines how many instructions per second the processor can execute. Thus, a CPU has a specific capacity of threads or instructions it is able to execute. Each process that is run on a computer contains at least one thread, and may contain multiple threads. As more threads are run on the CPU, the CPU capacity is filled, and the power consumption in the system increases. If threads are not run from processes from the operating system, low power threads are run on the remaining clock time. Examples of low power threads and their effects will be discussed below.

Figure 2:
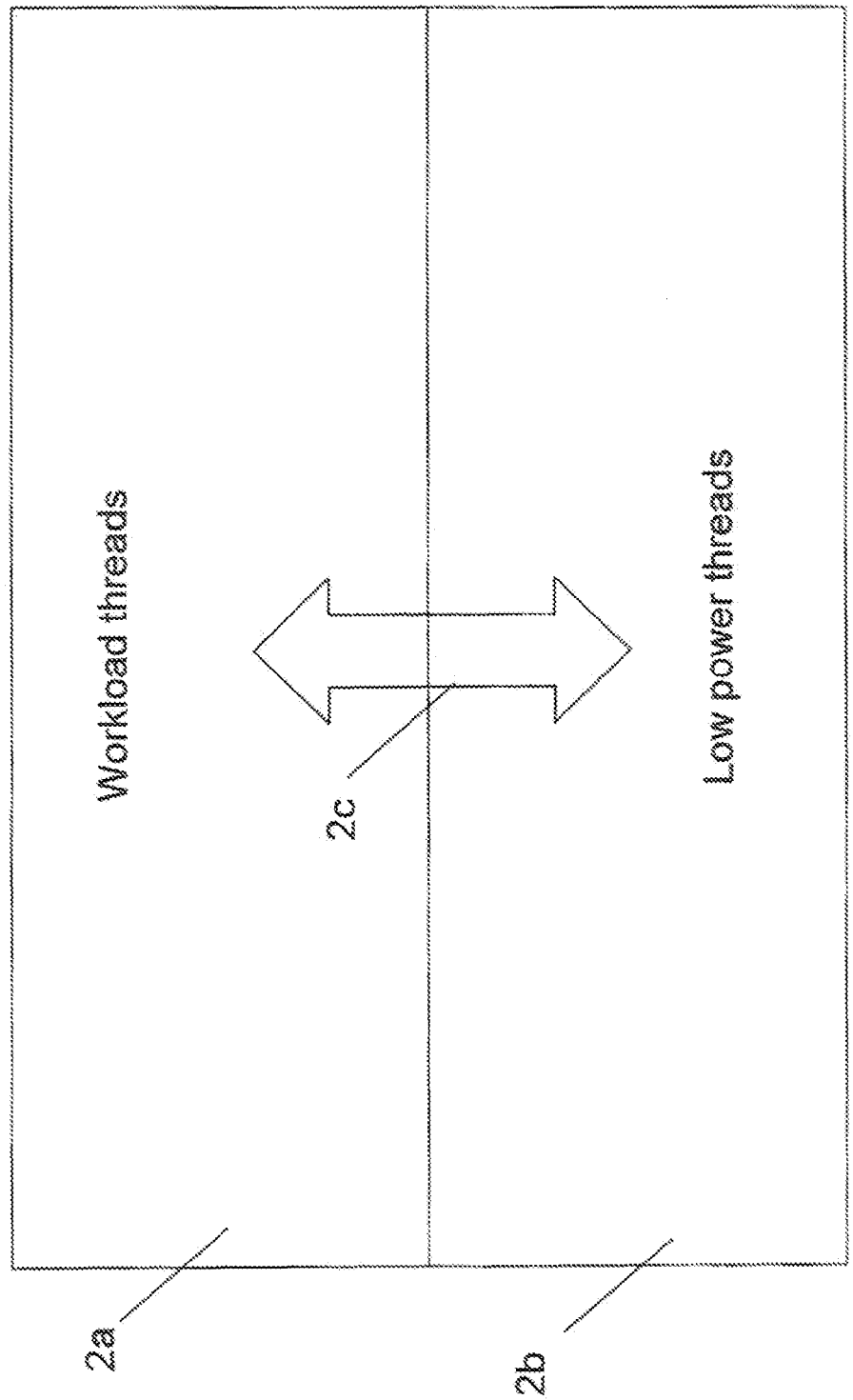
FIG. 2 is a schematic diagram depicting the relationship between workload threads and low power threads executed by the CPU.

FIG. 2 depicts the relationship between workload threads and low power threads executed by the CPU. Portion 2a of the CPU represents an exemplary amount of workload threads 2a executed by the CPU. Workload threads 2a are executed to run processes or applications for the operating system. Portion 2b of the CPU represents an exemplary amount of low power threads executed by the CPU on the clock time not utilized for executing the workload threads. The arrow 2c shows that the amount of workload threads executed by the CPU is inversely related to the amount of low power threads executed by the processor. As more workload threads are executed, less low power threads are executed. Conversely, if more low power threads are executed, then less workload threads are executed.

Executing a workload thread often requires more system resources than executing a lower power thread, such as a HALT instruction. The present invention manages power consumption by controlling the types of threads that are executed by the processor. Specifically, the present invention monitors the resources of the system to determine the power consumption of the system. Examples of power consumption monitoring will be described below. If the power consumption is too high, the present invention issues more low power threads to be executed by the processor.

In one embodiment, the low power thread executed is the C1E HALT instruction. Processors have various states. A processor in state C0 is in an active state. A processor in state C1 is in a sleep state. C1E denotes an enhanced sleep state that has lower power consumption than the C1 state. Thus, issuing a C1E HALT instruction puts the processor in a low power sleep mode for a clock cycle or portion of a clock cycle. However, note that each processor can potentially utilize a different instruction set architecture, and thus each processor has different low power instructions that are utilized. The present invention will utilize the C1E HALT instruction as part of an exemplary low power thread; however, this is in no way limiting, and any low power thread could be utilized. For example, a regular HALT thread could be utilized. Further, the present invention can utilize more than one type of low power thread. The types and combinations of low power threads utilized by the present invention should in no way be viewed as limiting on the invention.

In one embodiment, the present invention would issue more low power threads if the power consumption of the system exceeded a power utilization threshold. The power utilization threshold could represent an upper limit on the amount of power the system can consume, before action is taken to manage power consumption. The power utilization threshold can also be represented in many different forms. For example, the threshold can be specified in watts, in number of low power threads issued, in percentage of the CPU executing low power threads, to name a few. The form of the power utilization threshold is not limiting on the invention.

In one embodiment, the power utilization threshold is preset. In another embodiment, the power utilization threshold could be set by a user of the present invention. In another embodiment, the power utilization threshold could be dynamically determined by obtaining data from system resources. For example, if the system began to overheat, the number of workload threads being executed by the processor at that time could be set as the power utilization threshold. In another embodiment, if power consumption exceeded the power utilization threshold, a user of the system, system administrator, or other authorized person would be notified. This notification could occur by logging the event, by sending an email to an administrator or user, by having the system issue a specific alarm or noise, or by any other methods of notification. The method of notification is not limiting on the invention.

In one embodiment, the present invention is implemented as software that is running on the system processor. The software obtains measurements from a system resource to determine if the system is consuming too much power. Preferably, the software reads a power meter in the system to obtain power consumption information. In one embodiment, if the power consumption of the system exceeded a power utilization threshold, the software would initiate more low power threads. In another embodiment, if the power consumption of the system was below a power utilization threshold, the software would kill more low power threads. In one embodiment, if the system did not contain a resource that measured power consumption (like a power meter), the present invention could initially issue a specific or standard number of low power threads and monitor its effects on the system (for example, did a thermal event occur when X number of threads were issued). The present invention can continuously monitor the system and change the number of low power threads issued as necessary. The initial number of threads issued could be a pre-set amount (for example, 10% of CPU capacity, 10 low power threads, etc.), or could be set by a user of the system, a system administrator, or another authorized user. The amount of threads initially chosen is not limiting on the invention; rather, any amount could be utilized.

Figure 3:
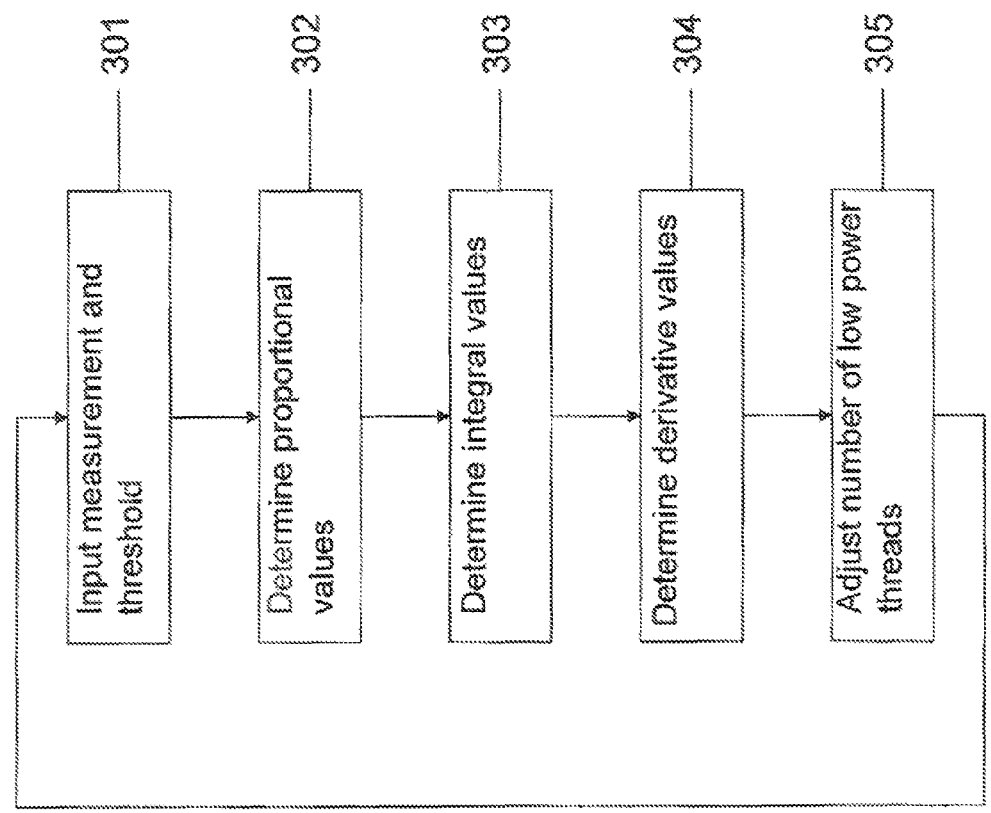
FIG. 3 is a flow chart depicting a PM loop.

In one embodiment, the software would be modeled on a PID control loop algorithm. Thus, the average power consumed by the system would be maintained at or below a prescribed level over a period of time. FIG. 3 depicts a flow chart showing one embodiment of the present invention with the use of a proportional-integral-derivative (PID) loop. A PID loop is a control loop feedback mechanism that continually obtains input measurements and tries to correct the error between the measured variable and a desired threshold by calculating and outputting a result that adjusts the process accordingly. The PID loop inputs power consumption measurements of the system, and the power utilization threshold (step 301). The PID calculates an amount of low power threads to run by using three parameters, proportional, integral and derivative values. The proportional value determines the reaction of the system to the current difference between the actual power consumption of the system and the power utilization threshold (step 302). The integral value determines the reaction of the system based on the sum of recent differences between the actual power consumption and the power utilization threshold (Step 303). The derivative values determines the reaction to the rate at which the number of low power threads has been changing (step 304). A weighted sum of these three values is used to adjust the number of low power threads that are executed (step 305).

In another embodiment, a software component would estimate a thread capacity and an optimum maximum number of threads for the current system hardware configuration as it relates to power, and would set the power utilization threshold accordingly. By utilizing system resources to determine a power utilization threshold, the number of workload threads executed by the processor would not exceed power capacity. In this embodiment, the power utilization threshold can be set dynamically by analyzing a relationship between the number of workload threads executed by the processor and its effect on system resources. In this embodiment, the power utilization threshold could also be constrained to be set or changed only by a system administrator or other authorized person.

In another embodiment, the software could provide a utility by which a user could view and manage power consumption. In this embodiment, the user could set or change the power utilization threshold. For example, the user could specify that the system should not consume more than 300 watts of power. The user could also specify, for example, that 25% of the threads executed by the processor should be low power threads. In this embodiment, a wide range of utilization thresholds could be utilized, allowing for greater flexibility in system performance. For example, a user could temporarily set the utilization threshold so that the system is running close to capacity because the user wants to run a power intensive program for a short period of time, and then subsequently reduce the threshold after the power intensive program has completed. In another embodiment, the user could also specify whether to change the number of low power threads that are currently executed by the processor. In one embodiment, the user could increase the number of low power threads executed by the processor after monitoring the power consumption of the system through the utility.

In another embodiment, if the system detected that a thermal event was about to occur that would result in the unexpected shutdown of the system, the power utilization threshold could be automatically lowered to prevent the thermal event. The power utilization threshold could be reduced by a set amount, could be reduced by a specific percentage (for example, 25%), or could be changed in a number of different ways. The determination of how much to lower the power utilization threshold is in no way limiting on the invention. Further, in this embodiment, the present invention may maintain the power utilization threshold, but instead the software could issue more low power threads to immediately effect the system resources being utilized by the processor to execute workload threads.

In one embodiment, the software of the present invention runs on a system, and only manages the power consumption of that specific system. In another embodiment, the software of the present invention is run on a system in a data center, where each system on the data center runs the software to manage their own power consumption.

In another embodiment, the software of the present invention runs on a server and manages the power consumption of a plurality of computer systems. For example, the server could be in a data center and the software could manage the power consumption for all of the systems in the data center. In this embodiment, the software could utilize the same power utilization threshold for all of the systems in the data center. In this embodiment, the software could utilize a different power utilization threshold for each specific system in the data center, or for specific groups of systems in the data center. The power utilization threshold may still be set by all of the methods described above. Further, a user of the software, or a system administrator or any other authorized person, could delineate what power utilization to use for what range of systems. The user of the software, for example, could delineate that one specific power utilization threshold be utilized for all of the systems in the data center that perform a specific function, or are within a specific IP range. Each system has an IP address associated with it. Only those systems with IP addresses that fall within the IP range chosen will be utilize a specific power utilization threshold. The range can be narrow, or can encompass a large number of the systems, or even all of the systems. The different characteristics used to determine the power utilization thresholds to set for a system or group of systems is not limiting on the invention; rather, a wide variety of characteristics or methods could potentially be utilized.

Figure 4:
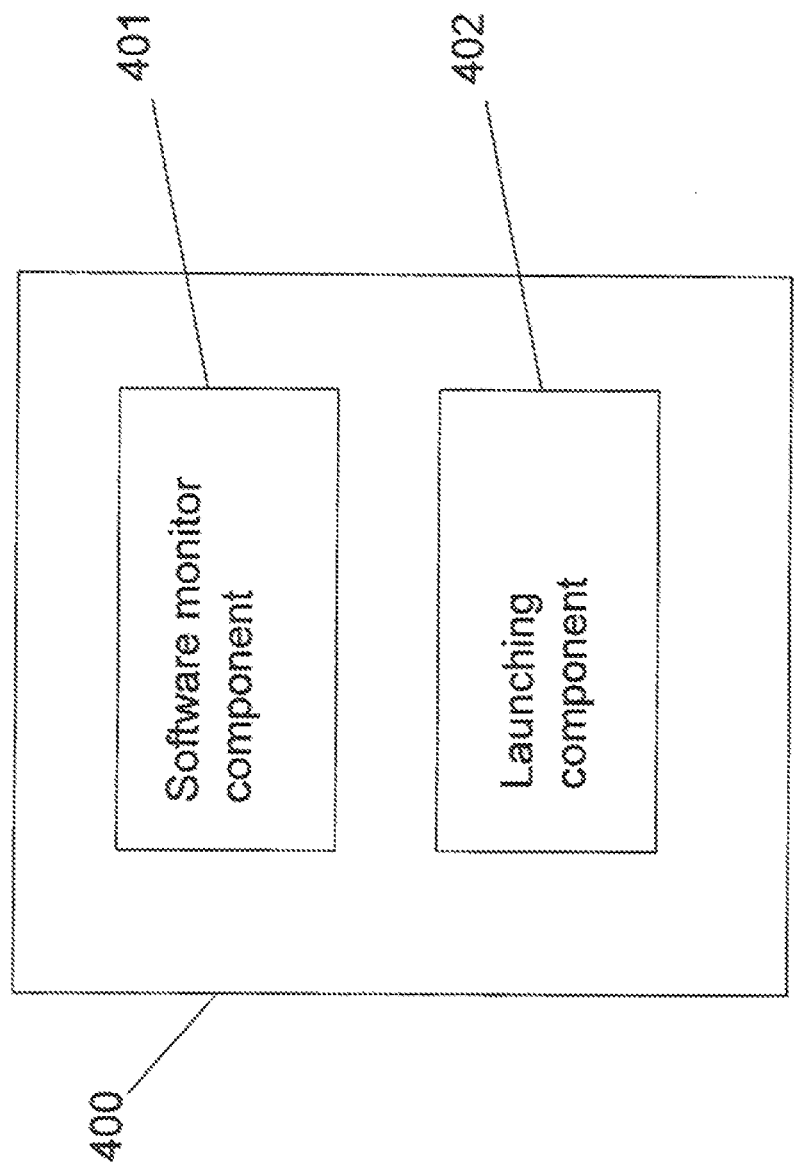
FIG. 4 is a schematic diagram depicting one embodiment of the invention.

FIG. 4 depicts another embodiment of the invention, with a computer system 400 containing the power management software of the present invention. Specifically, the system includes a software monitor component 401 to monitor variables related to power usage, such as, but not limited to, power and temperature. Depending upon the values of the variables in comparison to thresholds for those variables, the software monitor component could potentially issue instructions to launch low power threads to be executed by the processor. The system would also include a launching component 402 that would launch the low power threads upon receiving an instruction from the software component. Thus, the system would manage its power consumption in accordance with the present invention. In one embodiment, the variable monitored is power, and a power utilization threshold can be potentially be set in one of the manners described above. In another embodiment, a PID loop can be part of the software component to determine whether to launch a low power thread. In another embodiment, a user of the system can launch low power threads, as described above.

Figure 5:
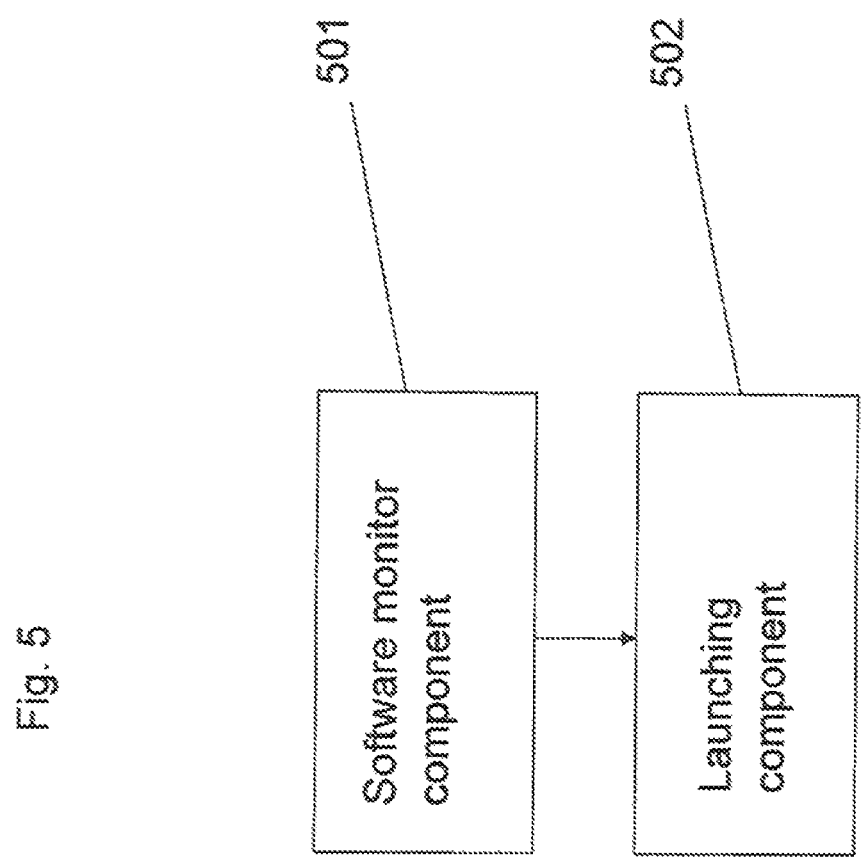
FIG. 5 is a flow chart depicting one embodiment of the invention.

FIG. 5 depicts another embodiment, with a method utilized for controlling power usage in a system, as per the present invention. Specifically, variables related to power usage in the system could be monitored (step 501). These variables could include, but are not limited to, power and temperature. If the value of one or more of the variables exceeds a threshold for that variable, a low power thread could be launched based upon an instruction issued from software on the system (step 502). In one embodiment, the variable monitored is power, and a power utilization threshold can potentially be set in one of the manners described above. In another embodiment, a PID loop can be utilized to determine the number of low power threads to launch. In another embodiment, a user of the system can component to launch low power threads, as described above.

The software of the present invention can be implemented in several different ways. The implementation of the software is not limiting on the invention.

In one embodiment, the software is installed on a computer readable medium as computer readable code which, when executed, carries out the functionality of the present invention as described herein.

In one embodiment, the software is installed on the system by a user, a system administrator, or another authorized person. The software communicates with the system through a driver, and obtains power consumption readings through the driver. The software then functions as detailed above, based upon the power consumption readings and state of the system in general.

In another embodiment, the software is pre-loaded and installed as part of the operating system kernel. The software utilizes the ACPI description tables to access power consumption readings through the power meter. ACPI is an Advanced Configuration and Power Interface specification that is utilized to lower power consumption in the system. It is generally utilized with hardware in the system. The ACPI tables provide hardware information regarding power consumption that can be utilized by the present invention to manage power consumption in the system as detailed herein.

In another embodiment, the software is either installed or pre-loaded on an operating system that is loaded on top of a hypervisor. A hypervisor is a virtual machine, that allows more than one operating system to be run on one processor. Specifically, the hypervisor manages system resources such as the processor and memory to allocate what each virtual operating system requires to run. A hypervisor can be booted, which then boots one or more Operating System kernels. The hypervisor could utilize drivers, or the ACPI tables, to obtain power consumption information depending on whether the software was pre-loaded into the operating system. In this embodiment, the hypervisor could utilize different power utilization thresholds for each operating system it supports. In this embodiment, the hypervisor could support one operating system that only ran low power threads. By supporting an operating system that only ran low power threads, the hypervisor would guarantee that a specific amount or percentage of low power threads were executed by the CPU. The system resources virtualized for that low power thread operating system could not be affected by other operating system applications or kernel application. Thus, by running only low power threads, the low power operating system guarantees that a proportion of overall system resources are only used to run low power threads.

In one embodiment, the software is installed on the system by a user, a system administrator, or another authorized person. The software includes a user input component, through which the user can issues instructions to launch low power threads. In one embodiment, the user input component could potentially utilize the software utility for viewing power consumption, as described above, to enable to the user to determine how many low power threads to launch. In another embodiment, the user could utilize different means to monitor power consumption, or could arbitrarily set the number of low power threads to launch. A launching component in the system would launch the low power threads based upon instructions from the user that are received by the user input component.

An exemplary system for implementing the overall system or method or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with a variety of programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. An apparatus for controlling power usage, comprising: one or more computers comprising:
a software monitor component to:
monitor one or more variables related to power usage in the apparatus, and
issue at least one instruction in response to the one or more variables exceeding at least one threshold; and
a launching component to launch, in response to the at least one instruction, at least one low power thread to increase a number of low power threads executing in the one or more computers, wherein the number of the low power threads launched is determined by a proportional-integral-derivative (PID) loop.

2. The apparatus of claim 1, wherein the software monitor component is run on top of a hypervisor.

3. The apparatus of claim 1, wherein the one or more computers further comprise:
a plurality of workload threads associated with application processes,
wherein increasing the number of the low power threads causes a reduction of a number of the workload threads.

4. The apparatus of claim 3, wherein the launching component is to kill at least one of the low power threads in response to the monitored one or more variables not exceeding the at least one threshold.

5. The apparatus of claim 3, wherein the low power threads are executable in clock cycles of a processor not utilized for the workload threads.

6. The apparatus of claim 3, wherein the one or more computers are to dynamically vary the at least one threshold by setting the at least one threshold to a value derived from a number of the workload threads.

7. A method for controlling power usage in a computer system, comprising:
monitoring one or more variables related to power usage in the computer system; and
in response to detecting the monitored one or more variables exceeding at least one threshold, launching at least one low power thread to increase a number of low power threads executing in the computer system, wherein the number of the low power threads launched is determined by a proportional-integral-derivative (PID) loop.

8. The method of claim 7, wherein the computer system comprises a plurality of workload threads associated with application processes, and wherein increasing the number of the low power threads causes a reduction of a number of the workload threads.

9. The method of claim 8, further comprising:
killing at least one of the low power threads in response to the monitored one or more variables not exceeding the at least one threshold.

10. The method of claim 8, wherein the low power threads are executable in clock cycles of a processor not utilized for the workload threads.

11. The method of claim 8, further comprising dynamically varying the at least one threshold by setting the at least one threshold to a value derived from a number of the workload threads.

12. A non-transitory computer readable medium, having installed thereon computer readable code which when executed, cause at least one computer system to:
monitor one or more variables related to power usage in the at least one computer system;
issue, by software in the at least one computer system, at least one instruction in response to the one or more variables exceeding at least one threshold; and
launch at least one low power thread in response to the at least one instruction to increase a number of low power threads executing in the at least one computer system, wherein the number of the low power threads launched is determined by a proportional-integral-derivative (PID) loop.

13. The computer readable medium of claim 12, wherein the software is run on top of a hypervisor.

14. The computer readable medium of claim 12, wherein the at least one computer system further comprises a plurality of workload threads associated with application processes, and wherein increasing the number of the low power threads causes a reduction of a number of the workload threads.

15. The computer readable medium of claim 14, wherein the computer readable code when executed cause the at least one computer system to further:
kill at least one of the low power threads in response to the monitored one or more variables not exceeding the at least one threshold.

16. The computer readable medium of claim 14, wherein the low power threads are executable in clock cycles of a processor not utilized for the workload threads.

17. The computer readable medium of claim 14, wherein the computer readable code when executed cause the at least one computer system to further dynamically vary the at least one threshold by setting the at least one threshold to a value derived from a number of the workload threads.

* * * * *

UNITED STATES PATENT AND TRADEMARK OFFICE
CERTIFICATE OF CORRECTION

PATENT NO. : 8,464,086 B2  
APPLICATION NO. : 12/920575  
DATED : June 11, 2013  
INVENTOR(S) : Darren J. Cepulis Page 1 of 1

It is certified that error appears in the above-identified patent and that said Letters Patent is hereby corrected as shown below:

On the Title page, in Item (54) and in the Specification, column 1, line 1, Title, delete "POWER CAPPING" and insert -- POWER-CAPPING --, therefor.

Signed and Sealed this  
Third Day of September, 2013

Teresa Stanek Rea  
*Acting Director of the United States Patent and Trademark Office*